Patented Sept. 8, 1931

1,822,396

UNITED STATES PATENT OFFICE

MORRIS G. FOWLER AND DIMITRY NICONOFF, OF CLARKDALE, ARIZONA, ASSIGNORS TO UNITED VERDE COPPER COMPANY, A CORPORATION OF DELAWARE

METHOD OF DEZINCING MATTES AND SLAGS

No Drawing.  Application filed January 14, 1929.  Serial No. 332,556.

This invention relates to a process for separating zinc from mattes and slags, by volatilizing the zinc from a molten bath of slag and matte in contact, by injecting suitable reducing agents through the liquid bath and in any suitable furnace or vessel. When the process is conducted as a batch process, we prefer to use a vessel similar in type to a copper converter, horizontal or vertical, equipped with tuyeres for injection of reducing agents, and from which the charge may be poured rapidly after the completion of the reduction.

Suitable reducing agents are any that will reduce iron from the oxides and zinc from its oxide or sulphide, and may be injected by means of tuyeres through the molten bath containing these oxides and sulphides. Solid, liquid or gaseous reducing agents may be used, but the choice depends on the efficiency of reduction and the cost of the reducing agent. The most suitable solid reducing agent is pulverized coal, which may be injected through the bath by means of steam or compressed air or a mixture of the two. Liquid reducing agents that may be used are the various hydrocarbon oils and they may be injected by themselves or with air or steam, or a mixture of the two. The reducing gases suitable are gaseous hydrocarbons, carbon monoxide and hydrogen, though in practice the pure gases are not used, due to their high cost, but producer gas or water gas, the reducing power of which depends on their contents of carbon monoxide, hydrogen and gaseous hydrocarbons, are used. In producer gas made from air or from air and steam, the reducing gas or gases are diluted with a considerable amount of nitrogen, the actual amount depending on the relative proportions of air and steam used in the producer. This is also true of gases generated in the bath, when solid or liquid fuels are injected with air or mixture of air and steam. The excess of inert gas helps evaporate zinc or its compounds from the bath and carry them off.

This process as developed is intended for the separation of zinc from mattes and slags from matting furnaces or mattes and slags produced from ore or concentrates by direct smelting of these in the converter type vessel. These ores or concentrates may be introduced into a bath of matte in the vessel and smelted by the heat available during oxidation of the matte while blowing air through the bath. We prefer to use oil or coal burners in the ends of the vessel so we can increase the smelting capacity. After a sufficient quantity of ore or concentrates have been smelted, we can stop the oxidation and inject reducing agents to volatilize the zinc.

Mattes and slags from matting furnaces may be treated for recovery of zinc by our process by introducing them together, preferably in molten condition, into the vessel and injecting reducing agents through them while in contact. We have found the relative proportion of matte and slag may vary within wide limits. We may also treat converter slag in contact with matte by this method, though this would not be necessary if the matte were dezinced before being converted. We have found by experiment that the reduction of matte by itself for the recovery of zinc and other readily volatile metals is more expensive, in respect to fuel cost, than the reduction in a similar manner of slag, basic or acid, by itself, and that the reduction of the two in contact is less expensive and is conducted more readily than the reduction of either by itself. In technical mattes, apparently all the zinc is present as sulfide which is not readily decomposed by the injected reducing agents, so in case of matte by itself, the contained zinc sulfide is decomposed by metallic iron produced by reduction of the iron oxide in the matte.

In the case of reduction of slags by themselves, the zinc is probably present both as sulfide and oxide. The zinc oxide is very readily reduced to metal and volatilizes readily since it apparently has less solubility in slag than in matte and consequently a higher vapor pressure. We believe the zinc sulfide is decomposed by metallic iron produced by reduction of some of the iron oxide in the slag, liberating metallic zinc. However, in the reduction of the slag by itself to volatilize the zinc, serious difficulties occur due to the thickening of the slag which we believe is due to the presence of metallic iron disseminated through the slag. In the case of basic slags, they become very mushy and it becomes practically impossible to inject reducing agents through them unless a very high temperature is maintained. In the case of acid slags they tend to foam on reduction, causing difficulty in handling and low efficiency in respect to the fuel used as reducing agent. The iron oxide in slag, uncombined with silica, seems to be more readily reduced than the iron oxide in mattes. In mattes, the iron oxide is possibly present as an FeO—FeS compound which is not readily reduced.

When we reduce a bath of slag and matte in contact, by injecting reducing agents through the bath, there is little or no tendency to thicken, provided, of course, the temperature is not permitted to drop. The metallic iron, produced by reduction of iron oxide from both the slag and matte dissolves readily in the matte, which has a lower melting point than metallic iron, thus preventing thickening of the slag. This dissolved metallic iron decomposes the zinc compounds in both the matte and slag, permitting the zinc to volatilize. The matte and slag are being mixed up thoroughly during the reduction, due to the agitation caused by the injection, so the constituents of the two liquid phases may react readily.

The zinc compounds are decomposed partly by the reducing gases themselves. Zinc oxide is reduced easily by any of the gases, CO, $H_2$, $CH_4$. We have also found that the sulfides ZnS—FeS are reduced to metal to some extent by hydrogen, if present in the gases.

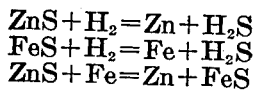

$$ZnS + H_2 = Zn + H_2S$$
$$FeS + H_2 = Fe + H_2S$$
$$ZnS + Fe = Zn + FeS$$

However, in considering the phenomena discovered by us, we believe it explainable as follows: most of the decomposition of the zinc compounds takes place by reaction with metallic iron, thus the presence of the slag, which contains iron oxide more readily reduced than that contained in the matte, is an aid to the recovery of zinc from the matte, and the presence of the matte giving a more fluid bath, due to its dissolving the metallic iron formed is an aid to the recovery of zinc from the slag.

The heavy metals copper, gold and silver contained in the furnace slags and which are normally lost, are recovered in large part in this process due to the fact that they separate readily from the slag under the reducing conditions and, with adequate settling, go into the matte. This is caused both by increase in silicate degree of the slag and reduction of oxides in the slag that tend to hold the matte in solution or suspension in the slag.

There are many variations possible in the application of our invention and we have described some possible applications only as being typical.

We claim:

1. The improvement in metallurgical operations for recovering metals from molten mineral baths which comprises injecting a reducing agent into a molten bath containing matte and slag to agitate the bath and reduce one or more of the metal compounds contained therein.

2. The improvement in zinc metallurgy which comprises subjecting a molten bath of matte containing a zinc compound to the action of a non-ferrous reducing agent in the presence of an easily reducible iron compound.

3. The improvement in metallurgical operations for recovering zinc from zinc-bearing mattes and slags which comprises subjecting a molten bath containing slag and matte to the action of a non-ferrous reducing agent.

4. The improvement in zinc metallurgy which comprises subjecting a molten bath containing matte and slag to the action of a non-ferrous reducing agent to produce metallic zinc, vaporizing the resulting zinc metal, and recovering the vaporized zinc.

5. The method of recovering zinc from ore containing copper and zinc which comprises smelting the ore to obtain a molten bath containing matte and slag, subjecting the resulting bath to the action of a non-ferrous reducing agent to produce metallic zinc, and separating and recovering the zinc.

6. The method of recovering zinc from ore containing copper and zinc which comprises smelting the ore to obtain a molten bath containing matte and slag, injecting a reducing agent into the resulting bath to agitate the bath, reduce zinc compounds contained therein and produce metallic zinc, vaporizing the metallic zinc, and recovering the vaporized zinc.

7. The improvement in metallurgical operations for recovering metals from molten mineral baths which comprises injecting a non-ferrous reducing agent into a molten bath of slag and matte to agitate the bath and reduce one or more of the metal compounds contained therein.

8. The improvement in metallurgical operations for recovering metals from molten mineral baths which comprises injecting a carbonaceous reducing agent into a molten bath of slag and matte to agitate the bath and reduce one or more of the metal compounds contained therein.

9. The improvement in metallurgical operations for recovering metals from molten mineral baths which comprises injecting a hydrocarbon into a molten bath of slag and matte to agitate the bath and reduce one or more of the metal compounds contained therein.

10. The improvement in metallurgical operations for recovering metals from molten mineral baths which comprises injecting a gas containing hydrogen into a molten bath of slag and matte to agitate the bath and reduce one or more of the metal compounds contained therein.

11. The improvement in metallurgical operations for recovering metals from molten mineral baths which comprises injecting a gaseous reducing agent into a molten bath of slag and matte to agitate the bath and reduce one or more of the metal compounds contained therein.

12. The improvement in metallurgical operations for recovering metals from molten mineral baths which comprises injecting a solid reducing agent into a molten bath of slag and matte to agitate the bath and reduce one or more of the metal compounds contained therein.

13. The improvement in metallurgical operations for recovering metals from molten mineral baths which comprises injecting a solid carbonaceous reducing agent into a molten bath of slag and matte to agitate the bath and reduce one or more of the metal compounds contained therein.

14. The improvement in metallurgical operations for recovering metals from molten mineral baths which comprises injecting a liquid reducing agent into a molten bath of slag and matte to agitate the bath and reduce one or more of the metal compounds contained therein.

15. The improvement in metallurgical operations for recovering metals from molten mineral baths which comprises injecting a gaseous carbonaceous reducing agent into a molten bath of slag and matte to agitate the bath and reduce one or more of the metal compounds contained therein.

16. The method of recovering zinc from ore containing sulphides of copper, zinc and iron which comprises smelting the ore to produce a molten bath of matte and slag containing iron oxide, and injecting a reducing agent into the bath to reduce the iron oxide and form metallic iron.

17. The method of recovering zinc from ore containing sulphides of copper, zinc and iron which comprises smelting the ore to produce a molten bath of matte and slag containing iron oxide, and injecting a reducing agent into the bath to agitate the bath and reduce one or more of the metal compounds contained therein.

18. The method of recovering zinc from ore containing sulphides of copper, zinc and iron which comprises smelting the ore to produce a molten bath of matte and slag containing iron oxide, injecting a reducing agent into the bath to agitate the bath, reduce one or more zinc compounds contained therein and form metallic zinc, and vaporizing the metallic zinc.

19. The method of recovering zinc from ore containing sulphides of copper, zinc and iron which comprises smelting the ore to produce a molten bath of matte and slag containing iron oxide, injecting a carbonaceous reducing agent into the bath to agitate the bath, reduce one or more zinc compounds contained therein and form metallic zinc, and vaporizing the metallic zinc.

20. The method of recovering zinc from ore containing sulphides of copper, zinc and iron which comprises smelting the ore to produce a molten bath of matte and slag containing iron oxide, injecting a hydrocarbon into the bath to agitate the bath, reduce one or more zinc compounds contained therein and form metallic zinc, and vaporizing the metallic zinc.

21. The method of recovering zinc from ore containing sulphides of copper, zinc and iron which comprises smelting the ore to produce a molten bath of matte and slag containing iron oxide, injecting a gas containing hydrogen into the bath to agitate the bath, reduce one or more zinc compounds contained therein and form metallic zinc, and vaporizing the metallic zinc.

22. The method of recovering zinc from ore containing sulphides of copper, zinc and iron which comprises smelting the ore to produce a molten bath of matte and slag containing iron oxide, injecting a gaseous reducing agent into the bath to agitate the bath, reduce one or more zinc compounds contained therein and form metallic zinc, and vaporizing the metallic zinc.

23. The method of recovering zinc from ore containing sulphides of copper, zinc and iron which comprises smelting the ore to produce a molten bath of matte and slag containing iron oxide, injecting a solid reducing agent into the bath to agitate the bath, reduce one or more zinc compounds contained therein and form metallic zinc, and vaporizing the metallic zinc.

24. The method of recovering zinc from ore containing sulphides of copper, zinc and iron which comprises smelting the ore to produce a molten bath of matte and slag containing iron oxide, injecting a solid carbonaceous reducing agent into the bath to agitate the bath, reduce one or more zinc compounds contained therein and form metallic zinc, and vaporizing the metallic zinc.

25. The method of recovering zinc from ore containing sulphides of copper, zinc and iron which comprises smelting the ore to produce a molten bath of matte and slag containing iron oxide, injecting a liquid reducing agent into the bath to agitate the bath, reduce one or more zinc compounds contained therein and form metallic zinc, and vaporizing the metallic zinc.

26. The method of recovering zinc from ore containing sulphides of copper, zinc and iron which comprises smelting the ore to produce a molten bath of matte and slag containing iron oxide, injecting a gaseous carbonaceous reducing agent into the bath to agitate the bath, reduce one or more zinc compounds contained therein and form metallic zinc, and vaporizing the metallic zinc.

MORRIS G. FOWLER.
D. NICONOFF.